US008739955B1

(12) United States Patent
Everhart

(10) Patent No.: US 8,739,955 B1
(45) Date of Patent: Jun. 3, 2014

(54) DISCRIMINANT VERIFICATION SYSTEMS AND METHODS FOR USE IN COIN DISCRIMINATION

(71) Applicant: Coinstar, Inc., Bellevue, WA (US)

(72) Inventor: Daniel D. Everhart, Edmonds, WA (US)

(73) Assignee: Outerwall Inc., Bellevue, WA (US)

( * ) Notice: Subject to any disclaimer, the term of this patent is extended or adjusted under 35 U.S.C. 154(b) by 0 days.

(21) Appl. No.: 13/793,827

(22) Filed: Mar. 11, 2013

(51) Int. Cl.

| | |
|---|---|
| ***G07F 7/04*** | (2006.01) |
| ***G06K 7/00*** | (2006.01) |
| ***G06K 9/00*** | (2006.01) |
| ***G07D 7/00*** | (2006.01) |

(52) U.S. Cl.
USPC .......... 194/207; 382/135

(58) Field of Classification Search
USPC .......... 194/206, 207; 209/534; 382/135, 136
See application file for complete search history.

(56) References Cited

U.S. PATENT DOCUMENTS

| | | | | |
|---|---|---|---|---|
| 5,522,491 | A * | 6/1996 | Baudat et al. | 194/207 |
| 5,620,079 | A | 4/1997 | Molbak | |
| 5,931,277 | A * | 8/1999 | Allan et al. | 194/317 |
| 5,995,927 | A * | 11/1999 | Li | 704/246 |
| 6,253,179 | B1 * | 6/2001 | Beigi et al. | 704/243 |
| 6,494,776 | B1 | 12/2002 | Molbak | |
| 6,902,049 | B2 * | 6/2005 | King | 194/302 |
| 7,520,374 | B2 | 4/2009 | Martin et al. | |
| 7,539,616 | B2 * | 5/2009 | Zhang et al. | 704/233 |
| 7,558,765 | B2 * | 7/2009 | Kiefer | 706/15 |
| 7,584,869 | B2 | 9/2009 | DeLazzer et al. | |
| 7,646,894 | B2 * | 1/2010 | Yang et al. | 382/115 |
| 7,653,599 | B2 | 1/2010 | Doran et al. | |
| 7,748,619 | B2 | 7/2010 | Martin et al. | |
| 7,773,784 | B2 * | 8/2010 | Boult | 382/124 |
| 7,815,071 | B2 | 10/2010 | Martin et al. | |
| 7,865,432 | B2 | 1/2011 | Doran et al. | |
| 7,874,478 | B2 | 1/2011 | Molbak | |
| 8,024,272 | B2 | 9/2011 | Doran et al. | |
| 8,073,287 | B1 * | 12/2011 | Wechsler et al. | 382/278 |
| 8,517,161 | B2 * | 8/2013 | Baudat | 194/206 |
| 2002/0117375 | A1 * | 8/2002 | Baudat et al. | 194/302 |
| 2003/0121754 | A1 * | 7/2003 | King | 194/302 |
| 2003/0121755 | A1 * | 7/2003 | King | 194/302 |
| 2003/0136629 | A1 * | 7/2003 | King et al. | 194/302 |
| 2003/0150687 | A1 * | 8/2003 | King | 194/207 |
| 2003/0192765 | A1 * | 10/2003 | Baudat | 194/302 |
| 2003/0217906 | A1 * | 11/2003 | Baudat et al. | 194/207 |
| 2007/0154078 | A1 * | 7/2007 | He et al. | 382/135 |
| 2007/0240967 | A1 * | 10/2007 | Martin et al. | 194/317 |
| 2008/0123931 | A1 * | 5/2008 | He et al. | 382/135 |
| 2011/0233028 | A1 * | 9/2011 | Baudat | 194/320 |

OTHER PUBLICATIONS

U.S. Appl. No. 12/806,531, filed Aug. 12, 2010.

(Continued)

*Primary Examiner* — Jeffrey Shapiro
(74) *Attorney, Agent, or Firm* — Perkins Coie LLP

(57) ABSTRACT

Systems and associated methods for coin discrimination are disclosed herein. In one embodiment, a method for discriminating coins includes obtaining an electromagnetic sensor signal of a coin, sampling the sensor signal, generating a fingerprint of the coin from the sampled sensor signal, and calculating an appraisal using the fingerprint and a linear discriminant vector. The appraisal can be compared to a threshold to determine whether the coin is valued or impostor. In some embodiments, the linear discriminant vector can be calculated using the valued and impostor coin populations' covariance and means.

27 Claims, 15 Drawing Sheets

(56) References Cited

OTHER PUBLICATIONS

U.S. Appl. No. 13/691,047, filed Nov. 30, 2012.
U.S. Appl. No. 13/681,047, filed Nov. 19, 2012.
"Covariance Matrix," Wikipedia, [Online], Dec. 7, 2012 at 01:03 [Retrieved Aug. 7, 2013], Retrieved from the Internet: URL: http://en.wikipedia.org/w/index.php?title=Covariance_matrix &oldid=526797194, 5 pages.
"Definitions of Multivariate Statistics on the Web," Google [Online], 2006 [Retrieved Dec. 23, 2006], Retrieved from the Internet: URL: http://www.google.com/search?hl+en &q+define%3A+multivariate+statistics, 1 page.
"How to Interpret an Inverse Covariance or Precision Matrix?" CrossValidated, Online} Posted Nov. 8, 2011 [Retrieved Aug. 7, 2013] Retrieved from the Internet: URL: http://stats.stackexchange.com/questions/10795/how-to-interpret-an-inverse-covariance-or-precision-matrix, 2 pages.
"Worked Example, a Cylinder Rolling Down a Slope," University of Cambridge Department of Applied Mathematics and Theoretical Physics [Online], undated, 2 pages.
Baker, M. J., "Maths-Matrix Arithmetic," Euclideanspace.com [Online], 1998-2006 [Retrieved on Dec. 23, 2006], Retrieved from the Internet: URL: http://www.euclideanspace.com/maths/algebra/matrix/arithmetic/index.htm, 4 pages.
Carey, G., "Multivariate Analysis of Variance (MANOVA): I. Theory," [Online], 1998, [Retrieved on Aug. 7, 2013], Retrieved from the Internet: URL: http://ibgwww.colorado.edu/~carey/p7291dir/handouts/manova1.pdf, 14 pages.
Flury, B., *A First Course in Multivariate Statistics,* Springer Texts in Statistics, 1997, pp. 279-297, 20 pages.
Simmons, B, "Inverse of a Matrix, Matrix Inverse, Multiplicative Inverse of a Matrix," www.mathwords.com [Online], Aug. 27, 2012 [Retrieved Aug. 7, 2013], Retrieved from the Internet: URL: http://www.mathwords.com/i/inverse_of_a_matrix.htm, 2 pages.
Stapel, E, "Matrix Inversion: Finding the Inverse of a Matrix," Purplemath [Online], 2003-2012 [Retrieved on Dec. 19, 2012], Retrieved from the Internet: URL: http://www.purplemath.com/modules/mtrxinvr.htm, 2 pages.

* cited by examiner

DISCRIMINANT VERIFICATION SYSTEMS AND METHODS FOR USE IN COIN DISCRIMINATION

TECHNICAL FIELD

The present technology is generally related to the field of coin discrimination.

BACKGROUND

Various embodiments of consumer-operated coin counting kiosks are disclosed in, for example: U.S. Pat. Nos. 5,620,079, 6,494,776, 7,520,374, 7,584,869, 7,653,599, 7,748,619, 7,815,071, 7,865,432, 8,024,272; and in U.S. patent application Ser. Nos. 12/806,531, 61/364,360, 61/409,050, 13/681,047, and 13/691,047; each of which is incorporated herein in its entirety by reference.

Many consumer-operated kiosks, vending machines, and other commercial sales/service/rental machines discriminate between different coin denominations based on the size, weight and/or electromagnetic properties of metal alloys in the coin. With some known technologies, a coin can be routed through an oscillating electromagnetic field that interacts with the coin. As the coin passes through the electromagnetic field, coin properties are sensed, such as changes in inductance (from which the diameter of the coin can be derived) or the quality factor related to the amount of energy dissipated (from which the conductivity/metallurgy of the coin can be obtained). An example of a property is the minimum value of the sensor signal as the coin passes through the electromagnetic field of the sensor. The results of the interaction between the coin and the sensor can be collected and compared against the properties of known coins to determine the denomination of the coin.

In some markets, however, different coin denominations have similar size and conductivity/metallurgy, especially when several countries gravitate to the same market. Such coins may cause similar sensor signals, including a similar minimum value of the sensor signal, making coin discrimination difficult and generating losses for the operator of the machine. For example, erroneously discriminating a lower value coin (i.e., an impostor coin) as a higher value coin (i.e., a valued coin) generates a loss equal to the difference between the nominal values of the coins. This discrimination error is known as a spoof. On the other hand, an erroneous rejection of a valid coin is a loss of profit that could have been collected by accepting the coin, also known as a forfeit. Accordingly, it would be advantageous to provide robust coin discrimination systems and methods that would work reliably for coins having similar size and conductivity/metallurgy.

DETAILED DESCRIPTION

Figure 1A:
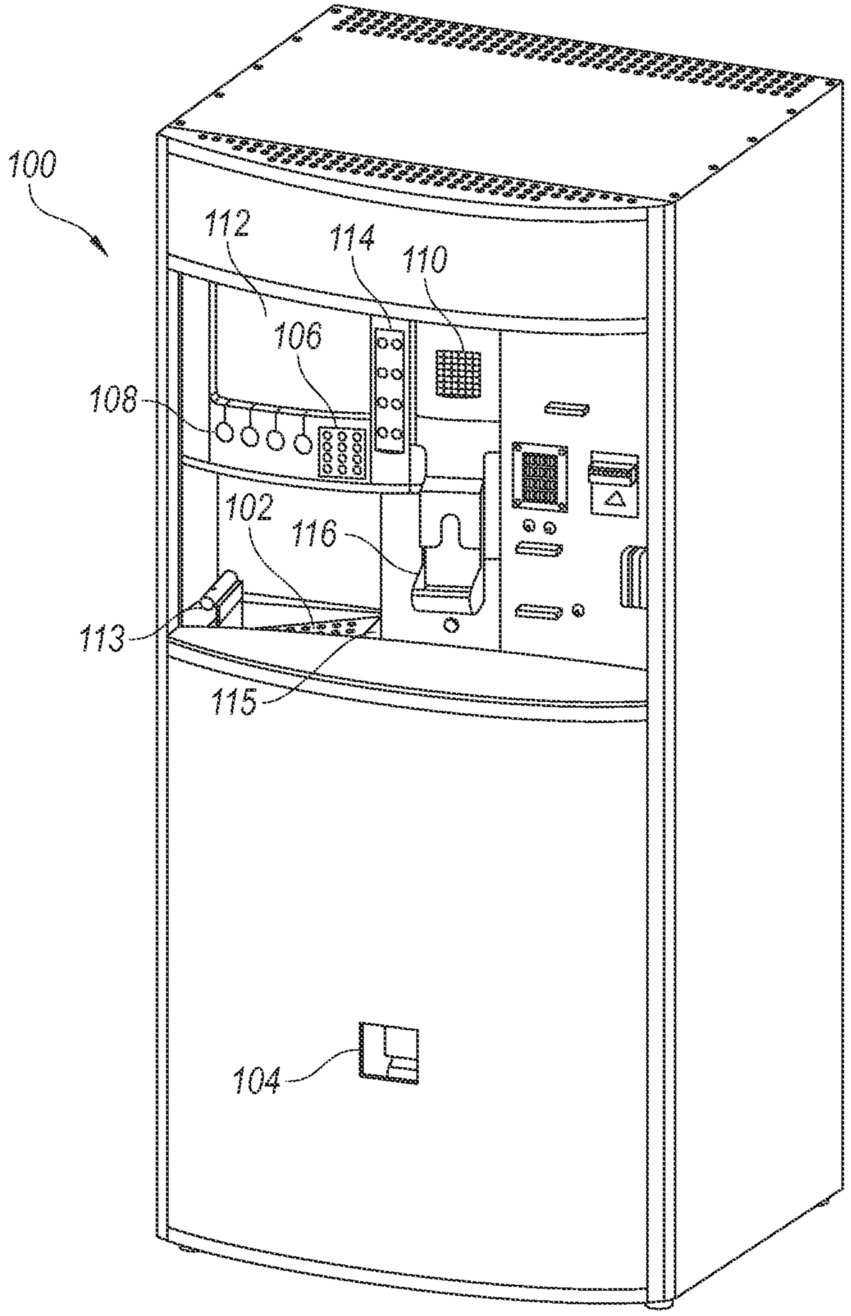
FIG. 1A is a front isometric view of a consumer-operated coin counting kiosk suitable for implementing embodiments of the present technologies.

The following disclosure describes various embodiments of systems and associated methods for discriminating coin denominations based on differential detection of the coins. In some embodiments of the present technology, a coin counting machine (e.g., a consumer-operated coin counting machine, prepaid card dispensing/reloading machine, vending machine, etc.) includes an electromagnetic sensor that can produce one or more electrical signals as a coin passes by the electromagnetic sensor. In some embodiments, the electromagnetic sensor operates at two frequencies (e.g., low and high) to produce a total of four signals representing: low frequency inductance (LD), low frequency resistance (LQ), high frequency inductance (HD) and high frequency resistance (HQ). These signals can be functions of, for example, the coin size, metallurgy and speed. Typically, the point of maximum deflection in a sensor signal occurs when a coin passes by or through the middle of the sensor. In some embodiments of the present technology, a group of points in the sensor signal (a "fingerprint") can be derived from a segment of the sensor signal between specific locations (features). Some examples of suitable features are: a voltage drop below the quiescent sensor signal, inflection points in the signal (i.e., approach, departure), and/or the maximum deflection of the signal. As described in greater detail below, the fingerprints can be used to discriminate among coin denominations.

In some embodiments of the present technology, especially in markets with known pairs of similar coins, the coin counting system can be trained using the fingerprints belonging to known impostor and valued coin denominations. The training can include generating the fingerprints corresponding to the impostor and valued coin populations by passing examples of each of the coins past the coin sensor or otherwise obtaining the corresponding sensor signals. A point-by-point multidimensional mean of the fingerprint signals can be determined separately for the impostor coin population and for the valued coin population. Such means can be represented as vectors having a number of elements that corresponds to the number of points in each fingerprint. Next, a covariance between the fingerprint signals belonging to the impostor coins and the valued coins can be determined and used as a measure of similarity between the two coin denominations.

Using the covariance and fingerprint means corresponding to the valued and impostor populations, a measure of distance between the two populations (valued and impostor) can be calculated. Such a measure is termed a linear discriminant vector. Without wishing to be bound by the theory, it can be shown that a linear discriminant vector can be calculated as a matrix product of (i) an inverse of the covariance matrix and (ii) a difference between the fingerprint means belonging to the impostor and valued coins. Having determined the linear discriminant vector (or otherwise having obtained it from existing system training results), the linear discriminant vector can be used to calculate an appraisal, which is a measure of "distance" of the coin characteristics from the characteristics of the valued coin population and/or the impostor coin population. In some embodiments, the linear discriminant vector and a fingerprint (also a vector) can be dot multiplied to generate a corresponding appraisal (a scalar) for a coin. Generally, a group of appraisals for the valued coins will be statistically different from a group of appraisal for the impostor coins because the two coin populations (valued and impostor) have similar, but not identical, diameter and/or metallurgy, therefore producing statistically similar, but not identical, fingerprints. Hence, the appraisals for the valued and impostor coins typically cluster around different means.

For a sufficiently large population of coins, the appraisals for the valued coins and for the impostor coins may follow multi-dimensional Gaussian or some other statistical distribution. Typically, for statistically similar coins (e.g., a valued/impostor pair) the statistical distributions of their respective appraisals will partially overlap. Therefore, in some embodiments of the present technology, a threshold (T) can be established to distinguish valued coins from impostor coins. For example, all coins having appraisals above the threshold can be declared impostor coins while all coins having appraisals below the threshold can be declared valued coins.

In at least some embodiments, due to a partial overlap of the statistical distributions corresponding to valued and impostor coins, the threshold choices necessarily cause some spoofs (i.e., an impostor coin accepted as a valued coin) and/or some forfeits (i.e., a valued coin rejected as an impostor coin). Therefore, the choice of threshold affects the accuracy of the coin discrimination and, ultimately, the profits and losses for the coin counting kiosk. In some embodiments, for example where fingerprint statistics follows a multinormal distribution, an optimum threshold can be determined based on a specified policy for tradeoffs between the spoofs and forfeits using iterative numerical methods, for example Brent's method. Furthermore, an optimum or near optimum threshold can be established for each valued/impostor pair based on the above training procedure, since optimum thresholds can be different for different pairs of valued/impostor coins. Optimum thresholds maximize the number (or the monetary value) of properly discriminated valued and impostor coins, thus minimizing the spoof/forfeit losses. Since the appraisals introduced above are based upon more detailed representations of coin properties, in many cases the inventive technology described herein results in overall better coin discrimination accuracy than conventional windowing technology. In some embodiment the inventive technology can be used when the conventional windowing technology has already discriminated a coin. For example, the inventive technology can be applied only on those coins that have known impostors in a given market, thus lowering the discrimination/computational effort associated with the inventive method.

Various embodiments of the inventive technology are set forth in the following description and FIGS. 1A-11. Other details describing well-known structures and systems often associated with coin counting machines, however, are not set forth below to avoid unnecessarily obscuring the description of the various embodiments of the disclosure. Many of the details and features shown in the Figures are merely illustrative of particular embodiments of the disclosure and may not be drawn to scale. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures.

FIG. 1A is an isometric view of a consumer coin counting machine 100 having a coin discrimination system configured in accordance with an embodiment of the present technology. In the illustrated embodiment, the coin counting machine 100 includes a coin input region or coin tray 102 and a coin return 104. The coin tray 102 includes a lift handle 113 for raising the tray 102 and moving the coins into the machine 100 through an opening 115 for counting. The machine 100 can further include various user-interface devices, such as a keypad 106, user-selection buttons 108, a speaker 110, a display screen 112, a touch screen 114, and/or a voucher outlet 116. The machine 100 can have other features in other arrangements including, for example, a card reader, a card dispenser, etc. Additionally, the machine 100 can include various indicia, signs, displays, advertisements and the like on its external surfaces. The machine 100 and various portions, aspects and features thereof can be at least generally similar in structure and function to one or more of the machines described in U.S. Pat. No. 7,520,374, U.S. Pat. No. 7,865,432, and/or U.S. Pat. No. 7,874,478, each of which is incorporated herein by reference in its entirety. In other embodiments, the coin detection systems and methods disclosed herein can be used in other machines that count, discriminate, and/or otherwise detect or sense coin features. Accordingly, the present technology is not limited to use with the representative kiosk examples disclosed herein.

Figure 1B:
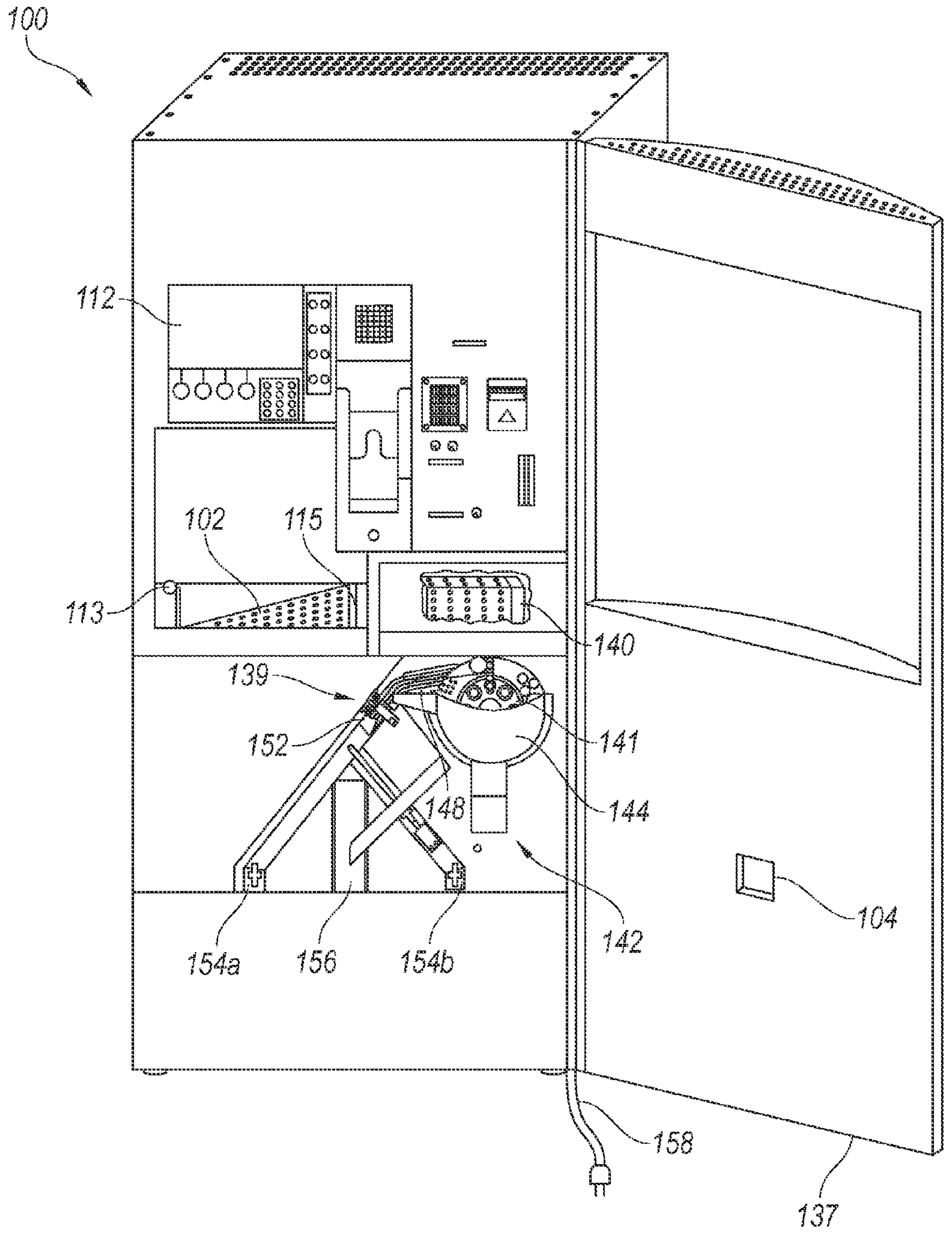
FIG. 1B is a front isometric view of the consumer-operated coin counting kiosk of FIG. 1A with a front door opened to illustrate a portion of the kiosk interior.

FIG. 1B is an isometric front view of an interior portion of the machine 100. The machine 100 includes a door 137 that can rotate to an open position as shown. In the open position, most or all of the components of the machine 100 are accessible for cleaning and/or maintenance. In the illustrated embodiment, the machine 100 can include a coin cleaning portion (e.g., a rotating coin drum or "trommel" 140) and a coin counting portion 142. As described in more detail below, coins deposited into the tray 102 are directed through the trommel 140 and then to the coin counting portion 142. The coin counting portion 142 can include a coin rail 148 that receives coins from a coin hopper 144 via a coin pickup assembly 141.

In operation, a user places a batch of coins, typically of different denominations (and potentially accompanied by dirt, other non-coin objects and/or foreign or otherwise non-acceptable coins) in the coin tray 102. The user is prompted by instructions on the display screen 112 to push a button indicating that the user wishes to have the batch of coins counted. An input gate (not shown) opens and a signal prompts the user to begin feeding coins into the machine by lifting the handle 113 to pivot the coin tray 102, and/or by manually feeding coins through the opening 115. Instructions on the screen 112 may be used to tell the user to continue or discontinue feeding coins, to relay the status of the machine 100, the amount of coins counted thus far, and/or to provide encouragement, advertising, or other information.

One or more chutes (not shown) direct the deposited coins and/or foreign objects from the tray 102 into the trommel 140. The trommel 140 in the depicted embodiment is a rotatably mounted container having a perforated-wall. A motor (not shown) rotates the trommel 140 about its longitudinal axis. As the trommel 140 rotates, one or more vanes protruding into the interior of the trommel 140 assist in tumbling the coins and moving them towards an outlet where they fall into an output chute (not shown) that directs the (at least partially) cleaned coins toward the coin hopper 144.

Figure 2:
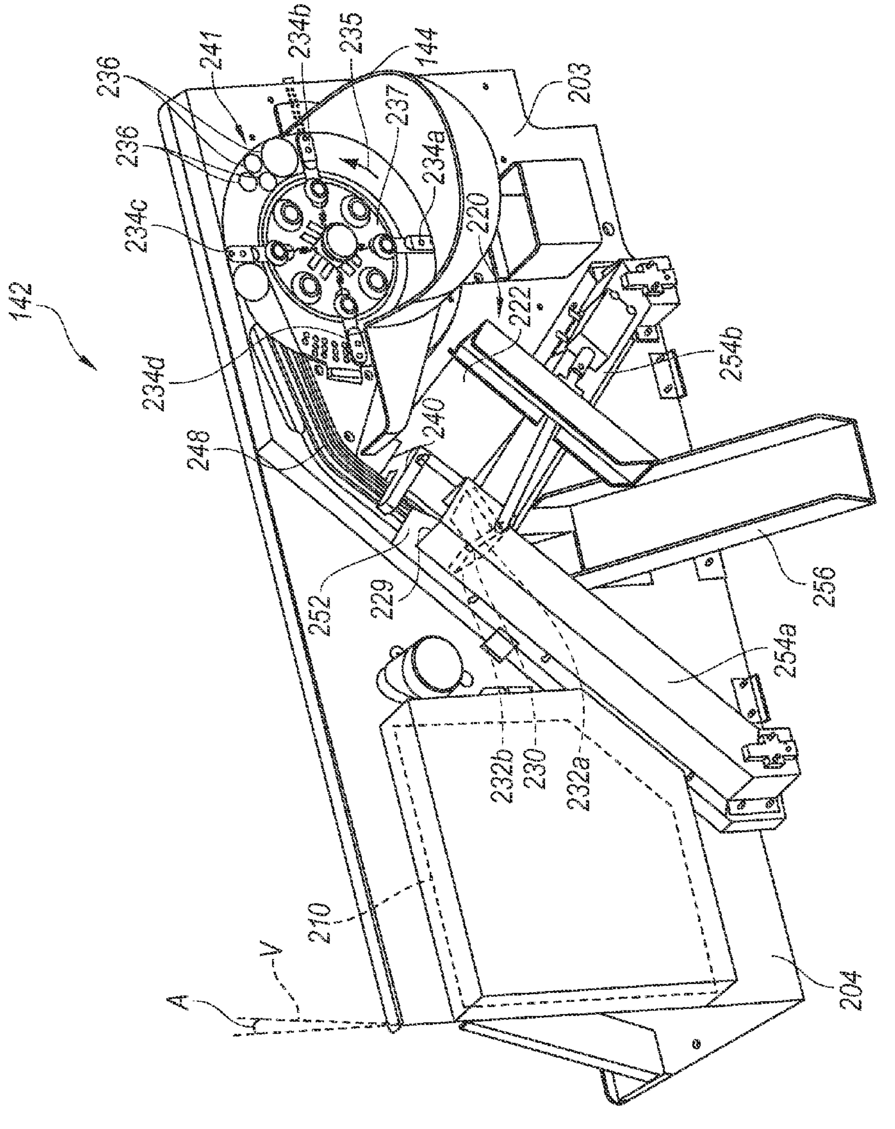
FIG. 2 is an enlarged front isometric view of a coin counting system of the kiosk of FIG. 1A.

FIG. 2 is an enlarged isometric view of the coin counting portion 142 of the coin counting machine 100 of FIG. 1B illustrating certain features in more detail. Certain components of the coin counting portion 142 can be at least generally similar in structure and function to the corresponding components described in U.S. Pat. No. 7,520,374. The coin counting portion 142 includes a base plate 203 mounted on a chassis 204. The base plate 203 can be disposed at an angle A with respect to a vertical line V of from about 0° to about 15°. A circuit board 210 for controlling operation of various coin counting components can be mounted on the chassis 204.

The illustrated embodiment of the coin counting portion 142 further includes a coin pickup assembly 241 having a rotating disk 237 with a plurality of paddles 234*a*-234*d* disposed in the hopper 144. In operation, the rotating disk 237 rotates in the direction of arrow 235, causing the paddles 234 to lift individual coins 236 from the hopper 144 and place them onto the rail 248. The coin rail 248 extends outwardly from the disk 237, past a sensor assembly 240 and further toward a chute inlet 229. A bypass chute 220 includes a deflector plane 222 proximate the sensor assembly and configured to deliver oversized coins to a return chute 256. A diverting door 252 is disposed proximate the chute entrance 229 and is configured to selectively direct discriminated coins toward a flapper 230 that is operable between a first position 232*a* and a second position 232*b* to selectively direct coins to a first delivery tube 254*a* and a second delivery tube 254*b*, respectively.

The majority of undesirable foreign objects (dirt, non-coin objects, oversized coins, etc.) are separated from desirable coins by the coin cleaning portion or the deflector plane 222. However, coins or foreign objects of similar characteristics to desired coins are not separated by the hopper 144 or the deflector plane 222, and pass through or past the coin sensor assembly 240. The coin sensor assembly 240 and the diverting door 252 cooperate to prevent unacceptable coins (e.g., foreign coins), blanks, or other similar objects from entering the coin tubes 254 and being kept in the machine 100. Coins within the acceptable size parameters pass through or by the coin sensor assembly 240. Specifically, in the illustrated embodiment the coin sensor assembly 240 and the associated electronics and software determine if an object passing through the sensor field is a desired coin, and if so, the coin is "kicked" by the diverting door 252 toward the chute inlet 229. The flapper 230 is positioned to direct the kicked coin to one of the two coin chutes 254. Coins that are not of a desired denomination, or foreign objects, continue past the diverting door 252 and into the return chute 256.

Figure 3A:
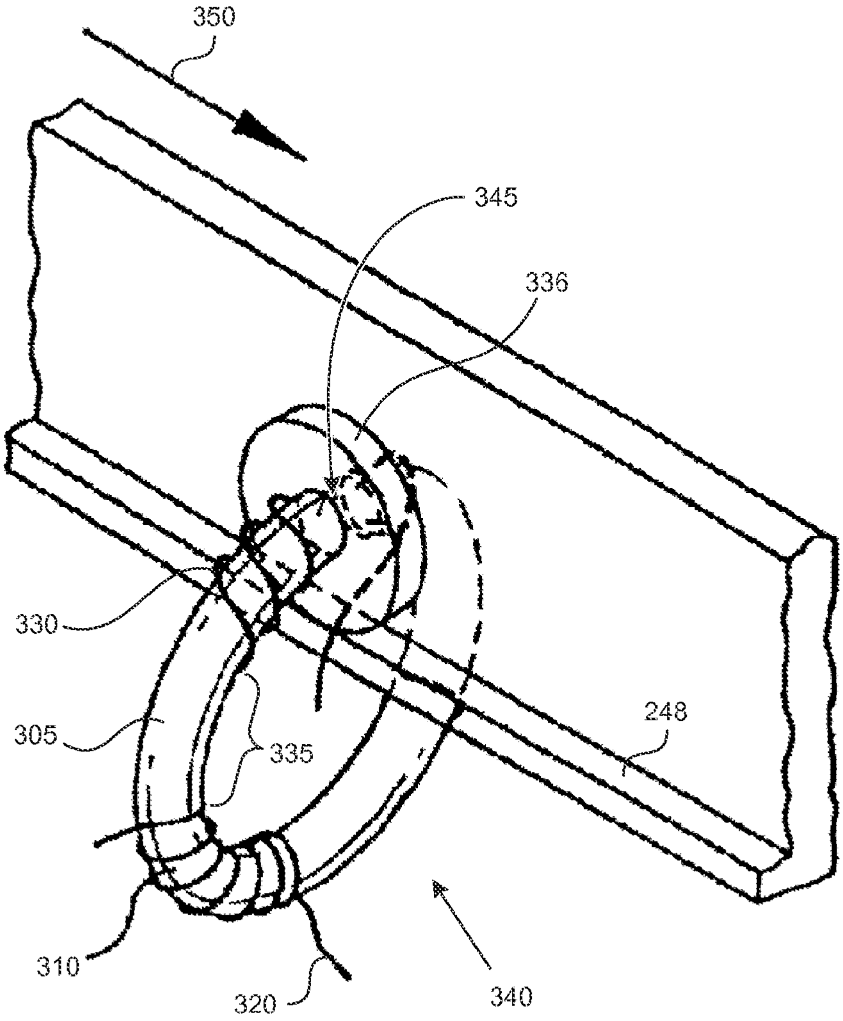
FIG. 3A is an enlarged isometric view of a coin sensor suitable for implementing embodiments of the present technologies.

FIG. 3A is an isometric view of a coin sensor 340 which may be included with the coin sensor assembly 240 of FIG. 2A. In the illustrated embodiment, the coin sensor 340 has a ferromagnetic core 305 and two coils: a first coil 320 and a second coil 330. The first coil 320 can be wound around a lower portion 310 of the sensor core 305 for driving a low frequency signal ($L_f$), and the second coil 330 can be wound around another region of the sensor core 305 for driving a high frequency signal ($H_f$). In the depicted embodiment, the second coil 330 (i.e., the high frequency coil) has a smaller number of turns and uses a larger gauge wire than the first coil 320 (i.e., the low frequency coil). Furthermore, the first coil 320 is positioned closer to an air gap 345 than the second coil 330 and is separated from the second coil 330 by a space 335 therebetween. Providing some separation between the coils is believed to help reduce the effect one coil has on the inductance of the other, and may reduce undesired coupling between the low frequency and high frequency signals.

When an electrical potential or voltage is applied to the first coil 320 and the second coil 330, a magnetic field is created in the air gap 345 and its vicinity. The interaction of a coin 336 or other object with the magnetic field yields data about the coin that can be used for coin discrimination, as described in more detail below. In one embodiment, a current in the form of a variable or alternating current (AC) is supplied to the first and second coils 320, 330. Although the form of the current may be substantially sinusoidal, as used herein "AC" is meant to include any variable wave form, including ramp, sawtooth, square waves, and complex waves such as wave forms which are the sum of two or more waveforms. As the coin 336 roles in a direction 350 along the coin rail 248, it approaches the air gap 345 of the sensor core 305. When in the vicinity of the air gap 345, the coin 336 can be exposed to a magnetic field which, in turn, can be significantly affected by the presence of the coin. As described in greater detail below, the coin sensor 340 can be used to detect changes in the electromagnetic field and provide data indicative of at least two different coin parameters of: the size and the conductivity of the coin 336. A parameter such as the size or diameter (D) of the coin 336 can be indicated by a change in inductance due to passage of the coin 336, while the conductivity of the coin 336 is (inversely) related to the energy loss (which may be indicated by the quality factor or "Q," representing a specific metallurgy of the coin 336). Therefore, in at least some embodiments the low frequency coil 320 and high frequency coil 330 can each produce two signals (D and Q) for a total of four signals representing a particular coin.

Figure 3B:
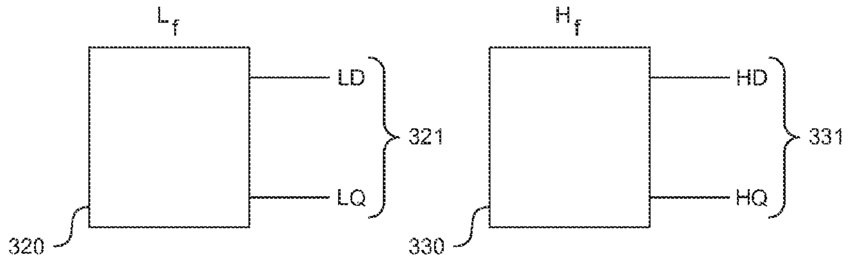
FIG. 3B is a schematic representation of the outputs from the coin sensor of FIG. 3A.

FIG. 3B is a schematic representation of signals 321 produced by the low frequency coil 320 and signals 331 produced by the high frequency coil 330. The signal from each coil that is related to a change in inductance, and therefore to the coin diameter, is termed "D" (e.g., LD and HD). The signal from each coil that is related to the coin resistance/conductance, and thus to the metallurgy of the coin, is termed "Q" (e.g., LQ and HQ). Although the signal D is not strictly proportional to a diameter of a coin (being at least somewhat influenced by the value of signal Q) and although signal Q is not strictly and linearly proportional to the conductance (being somewhat influenced by the coin diameter), there is sufficient relationship between signal D and coin diameter and between signal Q and coin conductance that these signals, when properly analyzed, can serve as a basis for coin discrimination based on the diameter and metallurgy of the coin.

Without wishing to be bound by theory, it is believed that the responses of signals Q and D are consistent, repeatable and distinguishable for coin denominations over the range of interest for a coin-counting device. Many methods and/or devices can be used for analyzing signals D and Q, including visual inspection of an oscilloscope trace or a graph, automatic analysis using a digital or analog circuit and/or a computer based digital signal processing (DSP), etc. When using a computer, it is useful to precondition signals D and Q through suitable electronics, which can be at least generally similar in structure and function to the circuits described in U.S. Pat. No. 7,520,374, to have a voltage range and/or other parameters compatible with the inputs to a computer. In one embodiment, for example the preconditioned signals D and Q can be voltage signals within the range of 0 to +5 volts. As described in detail below, features of signals D and Q can be compared against the features corresponding to a known coin in order to identify a denomination of the coin.

Figure 4:
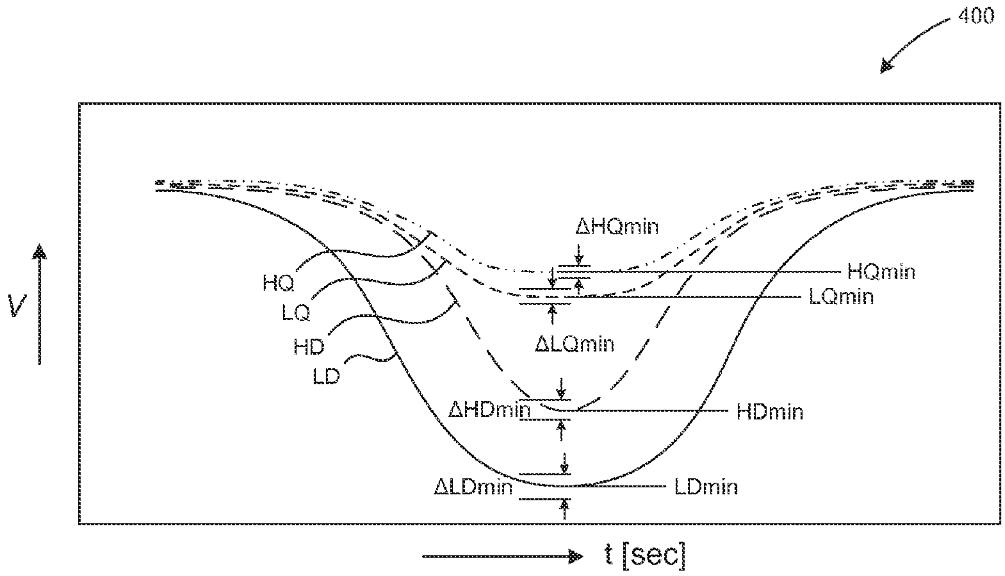
FIG. 4 is a graph of the coin sensor outputs of FIG. 3B.

FIG. 4 is a representative time/voltage graph illustrating a set of sensor signals 400 obtained through the interaction of a coin with the low and high frequency coils 320, 330, respectively, of the coin sensor 340 in FIG. 3A. As the coin passes by the coin sensor 340, each of the four signals (LD, LQ, HD and HQ) changes its value from a base voltage (close to zero) to a non-zero maximum offset, and then, as the coin leaves the air gap of the coin sensor, the signal voltage returns to the base value close to zero volts. As explained above in relation to FIG. 3A, the signal deflections will depend on the coin size and metallurgy. Typically, the low frequency coil 320 outputs (LD and LQ) produce signals with higher amplitude than the corresponding high frequency coil 330 outputs (HD and HQ). Additionally, the signals related to the diameter of the coin (LD and HD) generally have higher amplitudes than the counterpart signals related to the conductance of the coin (LQ and HQ). Thus, a coin sensed by the coin sensor 340 may produce a set of signals having the amplitudes ranked from the lowest to the highest as: HQ, LQ, HD, LD. Different rankings of the signal amplitudes are also possible since the amplitudes depend at least partially on the gains of the circuit components. In some known methods, for example, as a coin passes by the sensor 340, the signal amplitude is sensed and a maximum deflection of the signal is determined and compared to a set of specified ranges (windows) for known coin denominations, i.e., $\Delta LD_{min}$ for the LD signal, $\Delta HD_{min}$ for the HD signal, $\Delta LQ_{min}$ for the LQ signal, and/or $\Delta HQ_{min}$ for the HQ signal. If the maximum deflection of one or more sensor signals falls within the set of windows corresponding to a coin denomination, the coin is discriminated to that denomination, and its value is logged accordingly.

Figure 5:
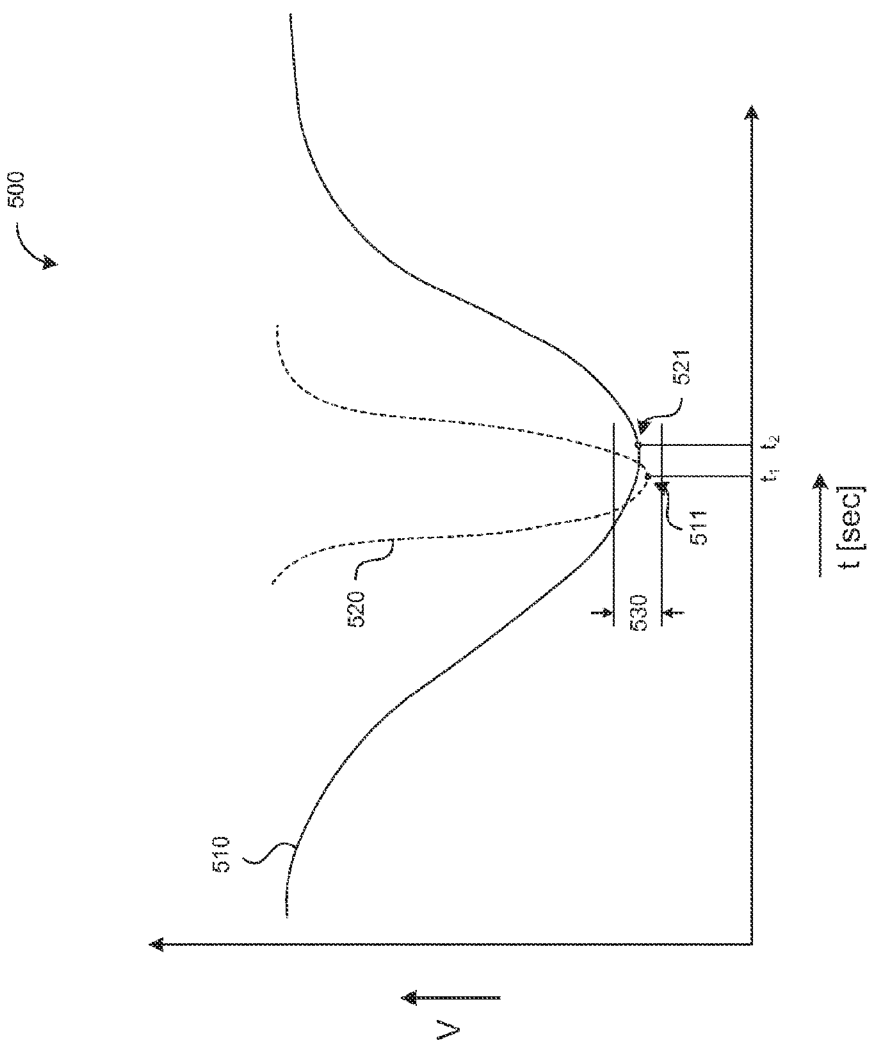
FIG. 5 is a graph of the coin sensor outputs of FIG. 3B for two different coins.

FIG. 5 is a graph of signal intensity vs. time illustrating coin sensor signals 510 and 520 for two coins of different denominations. The coin sensor signals 510 and 520 can be, for example, the LD signals, but other pairs of sensor signals (e.g., HD, LQ, HQ) corresponding to two coins of different denominations may have generally similar shapes. The illustrated coin sensor signals 510 and 520 have different shapes, thus the sensor signals are indicative of different coin denominations. The maximum deflections 511 and 521 are also different and occur at different times $t_1$ and $t_2$ for the two coins. However, the maximum deflections 511 and 521 fall within a range (window) 530 corresponding to $\Delta LD_{min}$. Therefore, conventional window based coin discrimination methods would not properly discriminate these two different coins. Instead, the two coins would be categorized in the same denomination, resulting in either a spoof or a forfeit for (at least) one of the coins.

Figure 6:
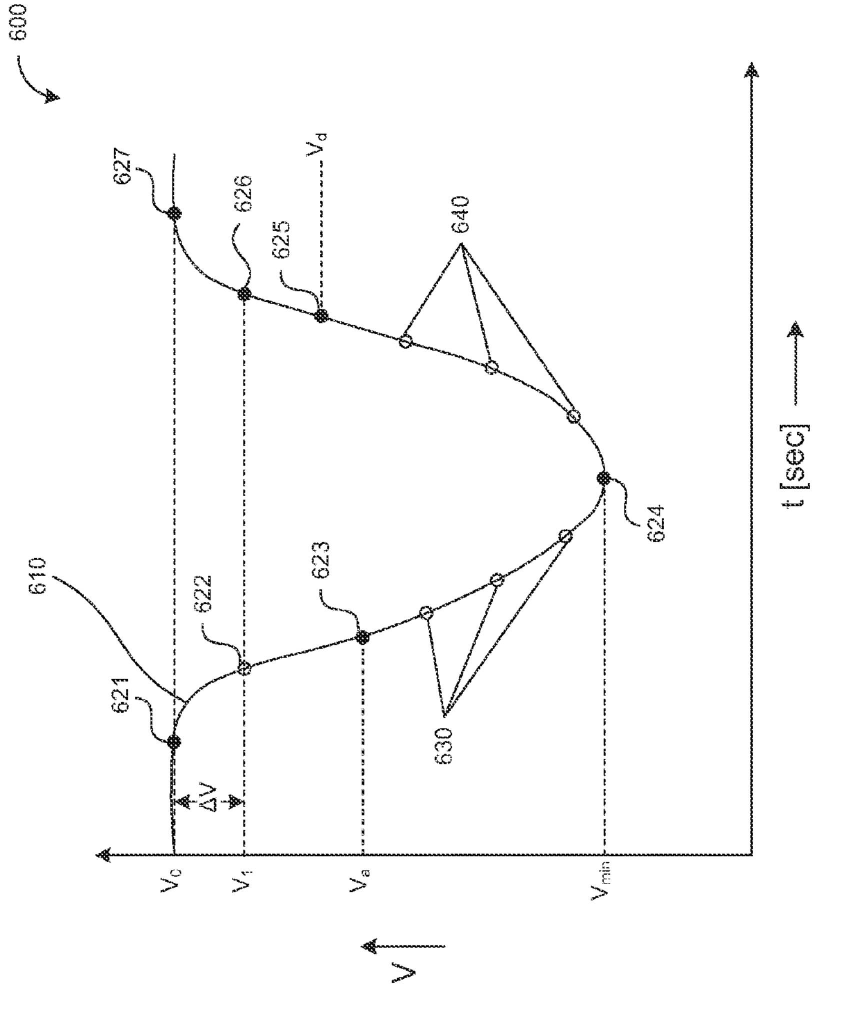
FIG. 6 is a graph showing signal features and markers in accordance with an embodiment of the present technology.

FIG. 6 illustrates a coin sensor signal 610 in accordance with an embodiment of the present technology. The sensor signal 610 can be LD, HD, LQ and/or HQ sensor signal obtained from, for example, a coin sensor 340. The sensor signal 610 may also be a combination of the sensor signals LD, HD, LQ and/or HQ. In some embodiments, the sensor signal 610 is filtered to remove signal noise. A person of ordinary skill in the art would know of many methods to electronically or digitally filter a sensor signal. Many digital filters can be used to remove noise from the sensor signal including, for example, a boxcar, a triangle, a Hanning or a Gaussian filter.

In the illustrated embodiment, a voltage $V_0$ corresponds to a quiescent sensor signal, i.e., a signal corresponding to when the coin sensor either does not yet sense the presence of a coin (point 621) or the coin has moved past the sensitivity range of the sensor (point 627). As the coin moves closer to the middle of the coin sensor, the voltage drops to a voltage $V_1$ (point 622). The difference between $V_0$ and $V_1$ is an onset voltage $\Delta V$. In some embodiments of the present technology, $V_1$ can signify an upper bound of a range of interest for the signal. Voltages $V_a$ (point 623) and $V_d$ (point 625) correspond to the approach and departure points, respectively. The voltages $V_a$ and $V_d$ can be the inflection points in the sensor signal, thus the second derivative of the sensor signal is zero or numerically close to zero at $V_a$ and $V_d$.

In some embodiments, $V_a$ and $V_d$ can be used as the end points (the "features") of a segment of interest of the sensor signal. Systems and methods for identifying the features can be at least generally similar in structure and function to those described in U.S. patent application Ser. No. 13/691,047, which is incorporated herein by reference in its entirety. Multiple segments of interest can be defined for a sensor signal. For example, $V_a$ (point 623) and $V_{min}$ (point 624) can be the end points of one segment of interest, while $V_{min}$ and $V_d$ can be the end points of another segment of interest. In some embodiments of the technology, additional points within the segments of interest can be defined to further describe the sensor signal. For example, in the segment having voltages $V_a$ and $V_{min}$ as end points, three additional uniformly spaced markers (points) 630 can be selected between the features $V_a$ and $V_{min}$. Similarly, three additional uniformly spaced markers 640 can also be selected in the segment having $V_{min}$ and $V_d$ as end points, yielding a total of nine points that describe the sensor signal 610: $V_a$ (point 623), three markers between $V_a$ and $V_{min}$ (points 630), $V_{min}$ (point 624), three markers between $V_{min}$ and $V_d$ (points 640), and $V_d$ (point 625). Collectively, these nine points embody information related to coin diameter and metallurgy.

Other methods and systems for selecting the features and/or additional markers between the features, producing a different number of points in a fingerprint, are also possible. For example, in some embodiments the features (i.e., the end points of a segment of interest) may be $V_a$ and $V_d$ (points 623 and 625), while additional markers are equally spaced between the $V_a$ and $V_d$. In other embodiments, the features can be, for example, voltage onsets 622 and 626. The markers can be selected by fitting a polynomial curve through the features of a sensor signal, followed by a numerical sampling to generate the markers between features. In some embodiments, the markers can be distributed between the features according to an estimated position of the coin with respect to the sensor. For coins that accelerate along their path, for example, such a distribution of the markers can be non-uniform on the time axis. Other non-uniform distributions of markers between the features are also possible. In some embodiments, a set of features can be used for coin discrimination without defining additional markers. Furthermore, the features/markers obtained by different methods can be combined into a combined set of features/markers.

In some embodiments of the present technology, the coin sensor signal 610 is discretized by sampling a continuous (i.e., analog) coin sensor signal at a sampling frequency. When a group of discrete points, however frequent, replaces a continuous coin sensor signal there is no guarantee that the features and/or markers precisely correspond to the timestamps of the available sampled points in the digitized sensor signal. For example, a selection of three equally spaced points (markers) between $V_a$ (point 623) and $V_{min}$ (point 624) may cause some of the markers to fall between the sampled points in the sensor signal. Similarly, defining $V_a$ as a point where the second derivative of the coin sensor signal is zero may cause the timestamp corresponding to $V_a$ to fall between the sampled points of the coin sensor signal. Therefore, in some embodiments of the present technology operators identified as, for example, abridgers map the features/markers to the sampled points in the coin sensor signal, identified collectively as an "excerpt." Some abridgers may operate on a single feature/marker to map it to a sampled point (also an excerpt). Other abridgers may operate on a pair of features, or a pair of markers, or a feature/marker pair and/or the markers therebetween. The abridgers can operate based on, for example, a mapping policy or logic. Some examples of mapping policies are listed in Table 1. For example, an "earlier" abridger can map a marker or a feature to the first available sampled point in the signal having a time stamp that precedes the time stamp of the marker or feature. Conversely, a "later" abridger can map a feature/marker to the first available sampled point having a time stamp bigger than the one corresponding to the feature/marker. A "closer" abridger can map a marker/feature to the sampled point with a time stamp that is closest to the marker/feature. Many other abridgers are also possible in accordance with the disclosed technology, some of which are also shown in Table 1.

TABLE 1

| Policy | Description |
|---|---|
| Earlier | Choose the sample with earlier timestamp. |
| Later | Choose the sample with later timestamp. |
| Wider | Choose the sample that increases the duration of the excerpt. |
| Narrower | Choose the sample that decreases the duration of the excerpt. |
| Closer | Choose the sample that is closer to the marker. |
| Farther | Choose the sample that is farther from the marker. |
| Proximal | Choose the sample that is toward the center of the coin. |
| Distal | Choose the sample that is away from the center of the coin. |

Figure 7:
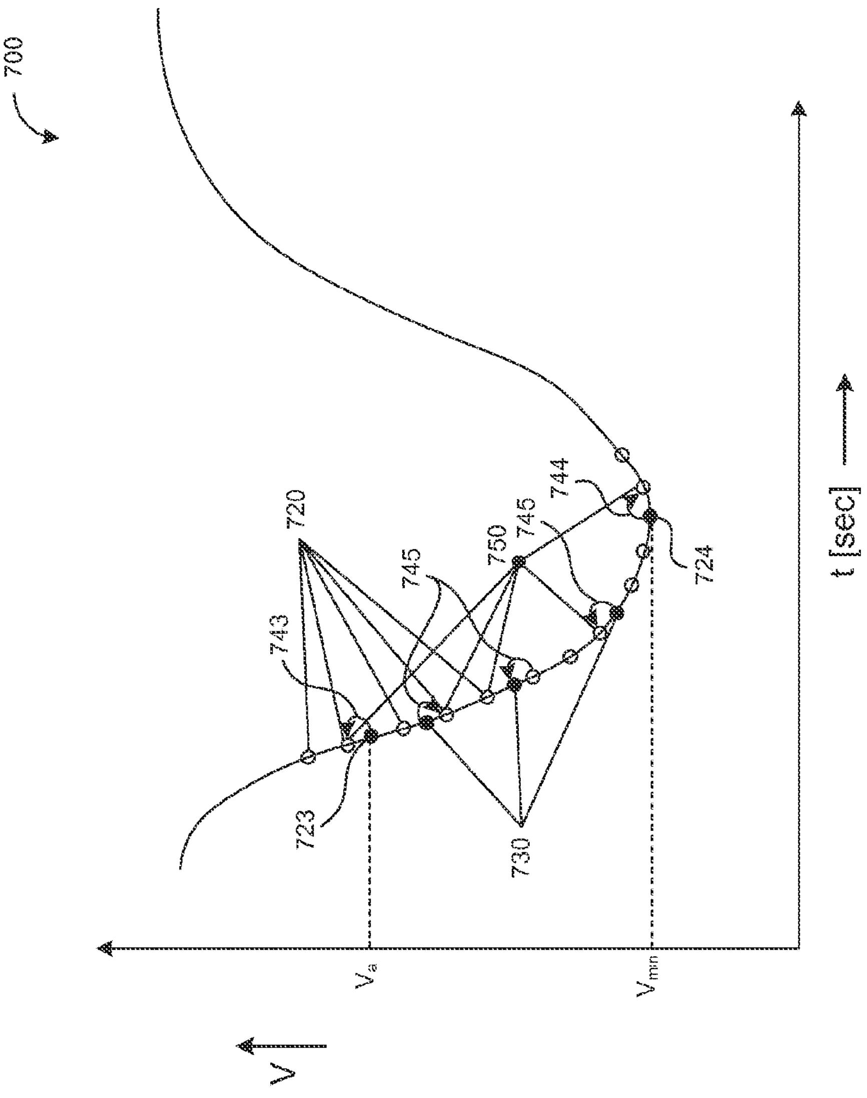
FIG. 7 is a graph showing signal excerpts in accordance with an embodiment of the present technology.

FIG. 7 illustrates an embodiment of an abridger that can map features and/or markers (solid circles 723, 730 and 724) to the sampled points in the signal (open circles 720). The illustrated abridger uses a policy of making the distance between the end points of the features/markers (points 723, 724) larger by assigning the first available earlier sampled point to the first feature/marker in the segment (point 723), and by assigning the first available later sampled point to the last feature/marker in the segment (point 744). Such an abridger corresponds to the "wider" abridger in Table 1. The mapping of the end point features to the sampled signal points is illustrated by arrows 743 and 744. Furthermore, the "closer" abridger can map the markers 730 to sampled signal points 720, as illustrated by arrows 745. The illustrated abridger thus maps the features/markers 723,730 and 724 to the corresponding sampled signal points of an excerpt 750.

The abridgers embodiments described above map features/markers to corresponding sampled signal points and define excerpts. In another aspect of these embodiments, operators termed distillers can create the fingerprints from one or more excerpts. A distiller may create a fingerprint using just a single point excerpt, for example a sampled signal point representing the $V_a$. In other embodiments, a distiller may produce a fingerprint using a statistical combination of the sampled points in the excerpts. For example, the arithmetic mean, median, or variance of the points in an excerpt can be calculated and used as a single fingerprint point (element). In other embodiments, a polynomial can be fitted through the excerpt, followed by using one or more coefficients of the polynomial to create a set of fingerprint points. Some examples of suitable orthogonal polynomials are the power polynomials, Chebyshev and Legendre polynomials.

Figure 8:
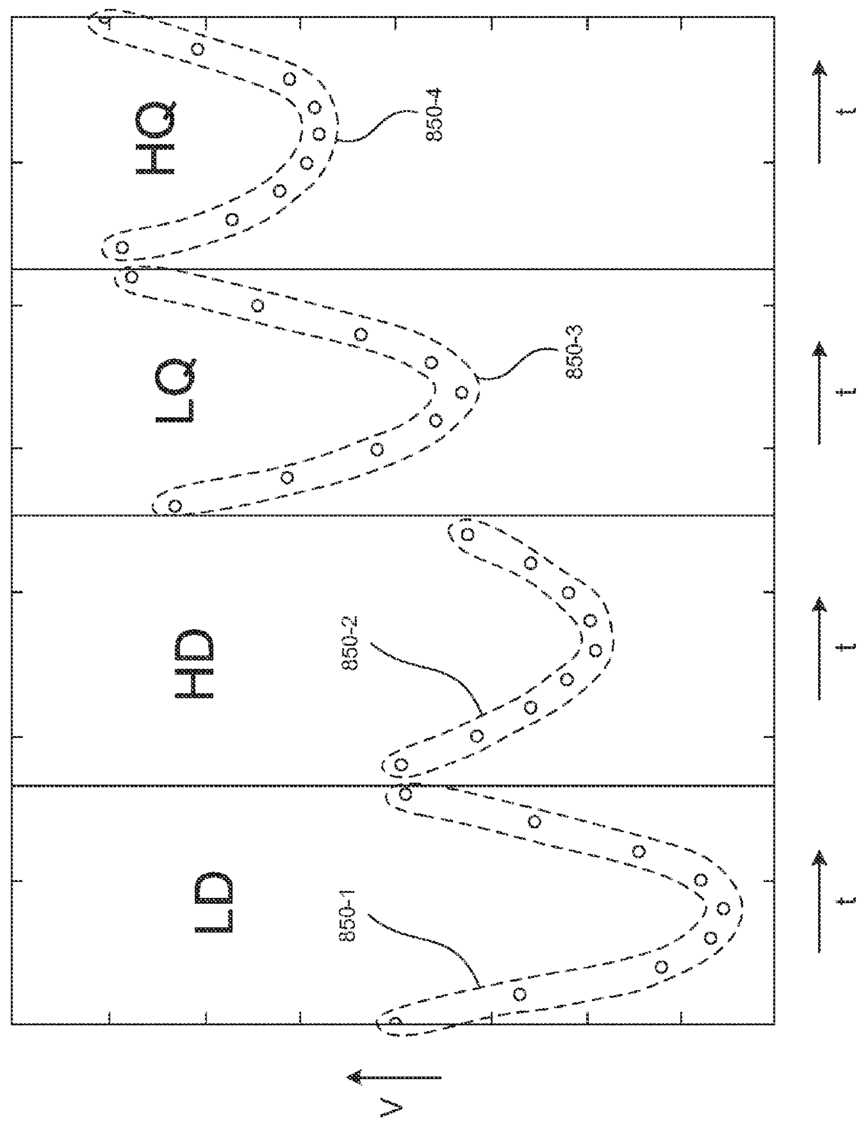
FIG. 8 is a representative graph showing fingerprints of the coin sensor outputs.

FIG. 8 illustrates a set of excerpts that can be arranged in a fingerprint according to embodiments of the present technology. In the illustrated example, one or more abridgers produced nine-point excerpts 850-1 to 850-4 for each of the sensor signals LD, HD, LQ and HQ. A distiller can create the corresponding fingerprint from the excerpts 850-1 to 850-4 by, for example, concatenating the four nine-point excerpts into a single 36-point fingerprint. In other embodiments, the distiller can find a mean value per each location in the excerpts, resulting in a fingerprint having nine points, each point being a mean value of the four points in the excerpts 850-1 to 850-4. Other distillers may down-sample the excerpts and then combine them in a fingerprint. The resulting fingerprint represents properties of the coin which can be analyzed to determine coin denomination.

Figure 9:
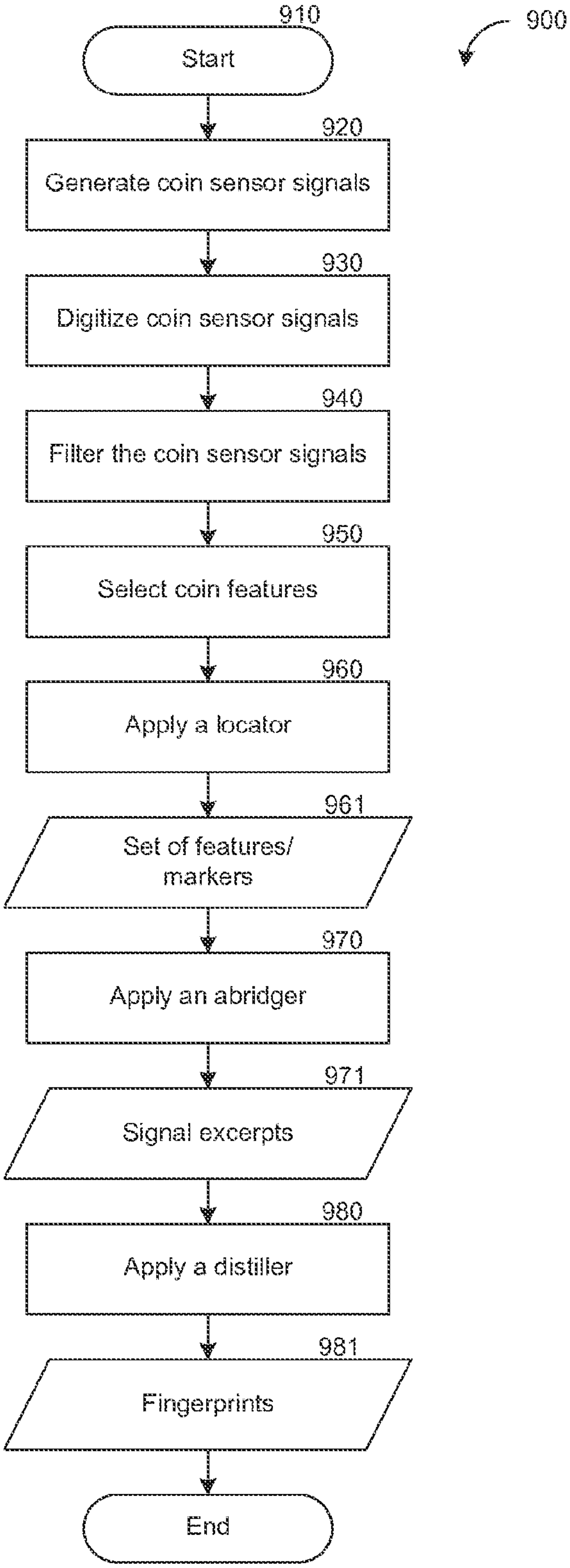
FIG. 9 is a representative flow diagram illustrating a routine for generating coin fingerprints in accordance with an embodiment of the present technology.

FIG. 9 illustrates a flow diagram of a process flow or routine 900 for generating the fingerprints according to an embodiment of the present technology. The routine 900 can be performed by one or more computers or other processing devices (including, e.g., a kiosk CPU, a remote server, PLC, etc.) according to computer-readable instructions stored on various types of suitable computer readable media known in the art. The process flow 900 does not include all steps for generating fingerprints, but instead provides certain details to provide a thorough understanding of process steps for practicing various embodiments of the technology. Those of ordinary skill in the art will recognize that some process steps can be repeated, varied, omitted, or supplemented, and other (e.g., less important) aspects not shown may be readily implemented without departing from the spirit or scope of the present disclosure.

The routine 900 starts in block 910. In block 920, coin signals are acquired by a coin sensor (e.g., the coin sensor 340 described above with regard to FIGS. 3A-3B). In some embodiments, the coin sensor can operate based on the changes in the electromagnetic field caused by the presence of the coin as described above. The coin sensor may produce several signals for the coin. In some embodiments, for example, the coin sensor has two coils operating at different frequencies, each coil producing two signals for a total of four sensor signals (e.g., LD, HD, LQ and HQ) as described above with respect to FIGS. 3A-4.

In block 930, the coin signals can be sampled to generate a set of discrete points. A person of ordinary skill in the art will understand many methods of sampling an analog signal to produce digital time series of required resolution and frequency. In block 940, the sensor signal can be filtered to remove signal noise. Some examples of suitable digital filtering algorithms include, for example, the box-car, triangle, Gaussian and Hanning filters. In some embodiments, a combination of digital filters can be used to optimize or at least improve the results.

Coin features can be selected in block 950 based on the digitized sensor signals, or in some embodiments based on the analog sensor signals. The coin features of interest can be, for example, a coin approach ($V_a$), a coin pivot ($V_{min}$), and a coin departure ($V_d$). The coin features may be detected by examining relevant derivatives of the sensor signal, including the zeroth, first, and second derivatives. Detection of the coin features of interest can be accomplished within the active zones by excluding the inactive zones of the sensor signal from consideration. For example, an onset level of the sensor signal can be established such that only the sensor signal below the onset is considered for the subsequent coin feature detection steps.

In block 960, one or more locators are applied to the coin features to generate additional points of interest (markers) of block 961. Some locators may generate a predetermined number of uniformly spaced points (markers) between a pair of features. Other locators may distribute the non-uniform markers between the features including, for example, distributing the markers according to an estimated position of the coin with respect to the sensor.

In block 970, an abridger operates on the features and/or markers to generate signal excerpts in block 971. The abridger can assign the features/marker to corresponding sampled points in the sensor signal. The abridgers can operate based on a selected mapping policy or logic including, for example, "earlier," "later," "closer," etc.

In block 980, a distiller can operate on one or more coin excerpts to generate signal fingerprints in block 981. In some embodiments, the distillers can combine excerpts corresponding to the LD, LQ, HD and HQ sensor channels into a single fingerprint having multiple points. In other embodiments, the fingerprints may contain just a single point, for example an excerpt corresponding to $V_d$ in one of the sensor signals. The process for generating the fingerprints ends in block 990, and can be restarted in block 910 for the next coin.

Each of the steps depicted in the routine 900 can itself include a sequence of operations that need not be described herein. Those of ordinary skill in the art can create source code, microcode, and program logic arrays or otherwise implement the disclosed technology based on the process flow 900 and the detailed description provided herein. All or a portion of the process flow 900 can be stored in a memory (e.g., non-volatile memory) that forms part of a computer, and/or it can be stored in removable media, such as disks, or hardwired or preprogrammed in chips, such as EEPROM semiconductor chips.

Figure 10:
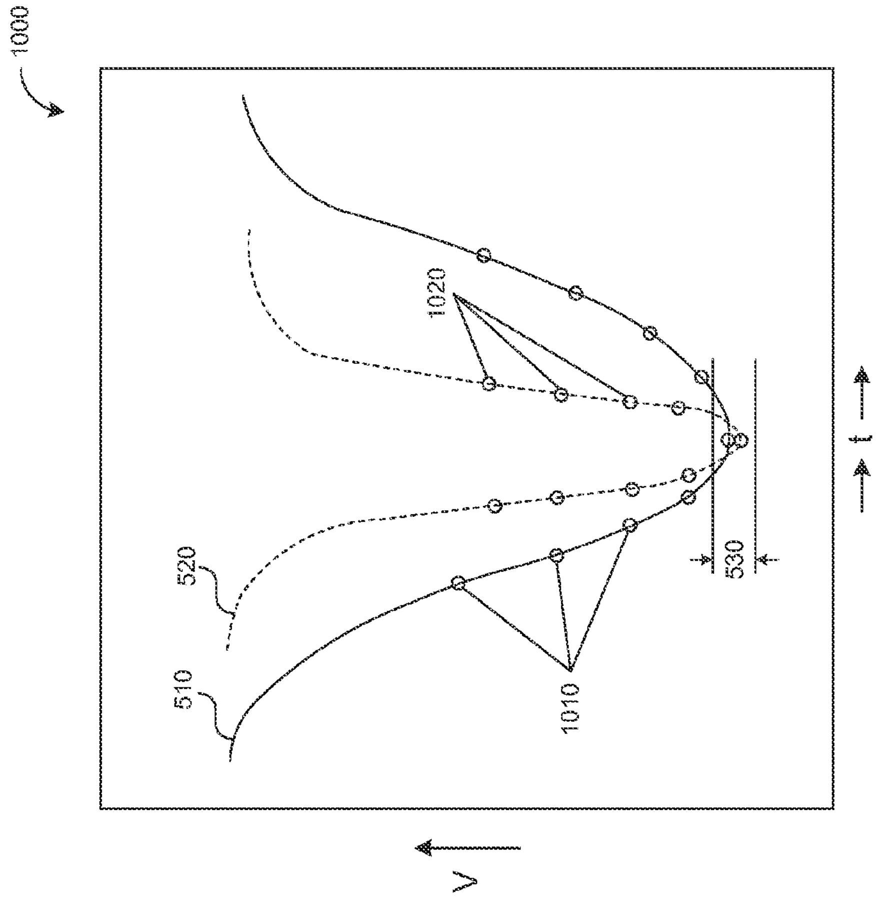
FIG. 10 is a representative graph showing coin fingerprints for two different coins.

FIG. 10 illustrates fingerprints corresponding to the pair of representative coins (e.g., valued/impostor coins) shown in FIG. 5. Here, the fingerprints 1010 (e.g., corresponding to a valued coin) and 1020 (e.g., corresponding to an impostor coin) may correspond to LD, HD, LQ and/or HQ sensor signals of the coin sensor 340. The illustrated fingerprints include nine sampled signal points, but other numbers of sampled signal points are also possible depending on the combination of features, markers and distillers. In some embodiments of the disclosed technology, different number of points per coin sensor signal can be used including, for example, no sampled points for some sensor signals (e.g., HQ). In the illustrated example, the sampled signal points corresponding to $V_{min}$ are within the window 530. Therefore, a conventional windowing algorithm would identify (discriminate) both coins, valued and impostor, to have the same denomination. The additional points in the fingerprints 510 and 520, however, can facilitate a more precise coin discrimination, as explained in more detail below.

In some embodiments of the disclosed technology, a fingerprint can be further processed to yield a number (or "appraisal") that can be used to discriminate a coin. The appraisal is a scalar which can be compared to a threshold (also a scalar) to determine whether a coin is a valued coin or an impostor coin. Coin counting systems that operate in markets with known or suspected valued/impostor pairs of coins can be trained using known valued and impostor coins. In one embodiment of the inventive technology, for example, a training of the coin counting system can include concatenating the excerpts, for example excerpts 850-1 to 850-4 in FIG. 8, into a fingerprint that is a column vector. The fingerprints of a valued coin yield a column vector "v", while the fingerprints of an impostor coin yield a column vector "w". For the example shown in FIG. 8, such column vectors would have dimensions $v_{36X1}$ and $w_{36X1}$ for the valued and impostor coins, respectively. The vector dimensions are used for illustration purposes and many other vector dimensions are possible, depending on the number of points in the fingerprints. Typically, during the training the method includes obtaining the fingerprints corresponding to multiple valued and impostor coins. For example, the method can collect $N_v$ fingerprints for the valued coins and $N_W$ fingerprints for the impostor coins. The corresponding fingerprint column vectors can be combined into training matrices as:

$$V=[v_1 v_2 \ldots v_{N_v}]\text{–valued training matrix}$$

$$W=[w_1 w_2 \ldots w_{N_w}]\text{–impostor training matrix}$$

Still following the above numerical example and assuming, for example, 73 valued coins and 99 impostor coins in the training batch, the dimensions of the matrices would be $V_{36X73}$ and $W_{36X99}$. Each column of the matrices V and W contains a fingerprint for either a valued coin (for V) or an impostor coin (for W). Having the training matrices V and W, it is possible to calculate the expected values μ per matrix row:

$$\mu=E[V]$$

$$\mu=E[W]$$

The expected value μ of a matrix row is an arithmetic mean of the fingerprint values in that row. Therefore, each element of a column vector $\mu_v$ or $\mu_w$ corresponds to an arithmetic mean of one location in the fingerprints, either valued or impostor. Following the above numerical example, the dimension of the expected valued and impostor matrices would be $\mu_{v36X1}$ and $\mu_{w36X1}$, respectively.

Training matrices V (valued) and W (impostor) can be combined into a combined training matrix U by concatenating matrices V and W:

$$U_{36X172}=[V_{36X73} W_{36X99}]$$

Note that each column in the combined training matrix U corresponds to a different coin, either valued or impostor, from the training batch. The values along the same row in the training matrix U represent the corresponding sampled points in the fingerprints, for example "the third sample point after the $V_{min}$ in LD signal" or "the last sampled point before the $V_d$ in HQ signal." A mean of all the sampled signal points along a row in the combined training matrix U, i.e., the expected value μ per the combined matrix row can be calculated as:

$$\mu_U=E[U]$$

Continuing with the above numerical example, the dimension of the expected value vector for the combined training matrix would be $\mu_{U36X1}$. Having calculated or otherwise obtained the combined matrix U and the expected values $\mu_U$, a sample covariance matrix ψ can be obtained as:

$$\psi=\langle (U_i-\mu_i)(U_i-\mu_i)\rangle$$

A person of ordinary skill in the art will know that the elements in the covariance matrix correspond to the level of correlation among the elements of the combined matrix U. For example, the element i, j of the covariance matrix q is indicative of the correlation between the points i and j in the fingerprints across all the fingerprints. In the above numerical example, $N_U$ is 172 (i.e., 73+99) and the dimension of the covariance matrix is $\psi_{36X36}$.

Knowing the covariance matrix $\psi$, a linear discriminant vector can be calculated as:

$$d=\psi^{-1}(\mu_w-\mu_v)$$

Without wishing to be bound by theory, the linear discriminant vector can be understood as a vector maximizing the numerical distances between the means of the valued and impostor coin populations by specifying a numerical projection from the multidimensional points into a single dimension. For example, assuming a fingerprint having three points, the populations of the valued and impostor coins can be visualized as being distributed in a 3D space. The two coin populations, valued and impostor, would cluster around different centers in this 3D space, i.e., in an ellipsoid. The distance between the centers of the two populations is a function of the dissimilarity of the metallurgy and size of the valued and impostor coins. A more “similar” metallurgy and/or diameter of the impostor/valued coin pair causes a shorter distance between the two means. Therefore, some overlap between the two clusters can be expected for the valued/impostor coin populations because of the statistical distribution of the points in the 3D space. A mathematical projection that maps each point onto a line passing through the two centers of the two clusters can be interpreted as the linear discriminant vector. The above visualization is not possible with fingerprints having 36 points, as in the above numerical example, resulting in a 36D space and the linear discriminant vector $d_{36X1}$.

In some embodiments of the technology, a dot product between a transpose of the linear discriminant vector d and fingerprint v or w can be determined as:

$$a_{1X1}=d'_{1X36}\cdot v_{36X1}$$

The scalar “a” is termed an appraisal. Without wishing to be bound by theory, the appraisal may be understood as representing a “distance” from a center of the valued (or impostor) coin population to a particular fingerprint. In other words, the appraisal represents a projection of a particular fingerprint to the linear discriminant vector d. Following the above numerical example, such a “projection” occurs in a 36D space.

Figure 11:
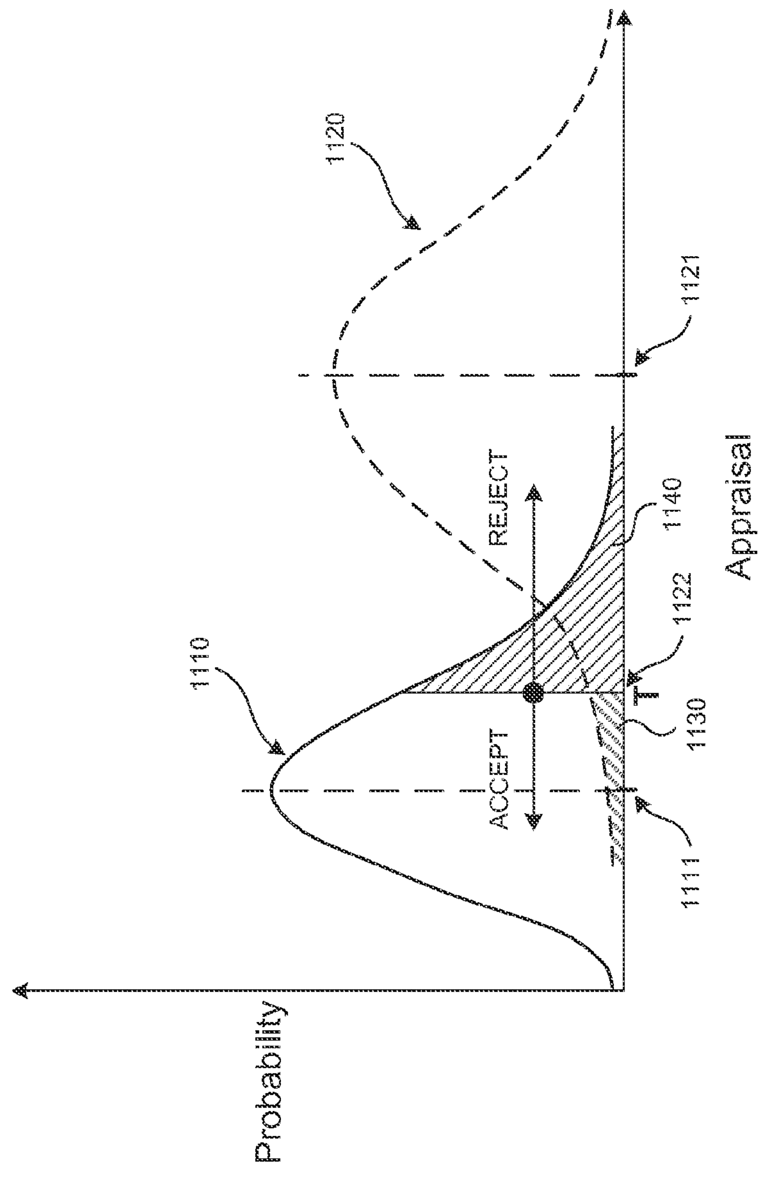
FIG. 11 is a graph showing thresholds for representative coin population distributions.

FIG. 11 is a graph of the statistical distributions of the appraisals belonging to example valued and impostor coins. In many cases, the appraisals follow a normal distribution when the coin population is sufficiently numerous, but other statistical distributions are also possible. The appraisals corresponding to the valued (1110) and the impostor (1120) coins tend to cluster about different means (1111 and 1121, respectively). Typically, there is some overlap in the appraisal distributions for the valued and mean coins, depending on the distance between the means and the magnitude of the standard deviation of the each population. For the valued/impostor coin denominations having similar metallurgy and/or coin diameter, the means 1111 and 1121 will be closer, and vice versa. Similarly, a better uniformity of the coin properties within a population, valued and/or impostor, results in a smaller standard deviation and vice versa. In some embodiments of the inventive technology, a threshold T (point 1122) can be established to delineate the acceptable (valued) from the rejected (impostor) coins. In the illustrated example, the coins having an appraisal smaller than the threshold T are accepted and credited as valued coins. Conversely, the coins having an appraisal larger than T are rejected (and, e.g., returned to the customer). In many practical field cases there is some overlap between the valued/impostor appraisal populations. In the illustrated example, a shaded area 1130 represents a population of spoof coins, while a shaded area 1140 represents a population of forfeit coins. Therefore, the choice of the threshold T can be based on a tradeoff between the acceptable levels of spoofs vs. forfeits, as explained in relation to FIG. 12 below.

Figure 12:
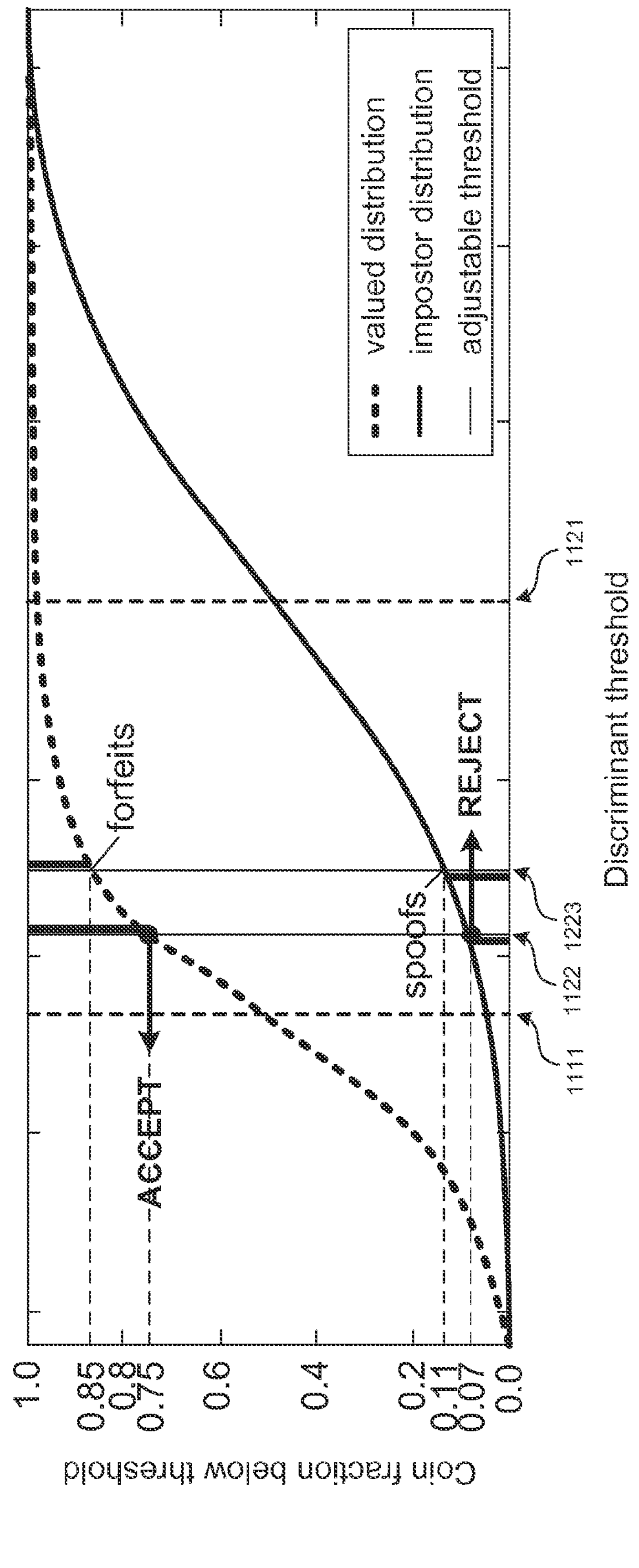
FIG. 12 is a graph showing a threshold for representative cumulative probability function distributions.

FIG. 12 is a representative graph of cumulative distribution functions for the two coin populations (valued and impostor) shown in FIG. 11. The cumulative distribution functions grow from 0 to 1 over the range of appraisals. The mean values of the appraisals for the valued and impostor coin populations (points 1111 and 1121, respectively) correspond to the cumulative distribution function being 0.5 (i.e., 50%). In the illustrated example, a choice of threshold T at point 1122 results in about 22% forfeits (i.e., a valid coin being rejected) and about 7% spoofs (i.e., an impostor coin being accepted). If, for example, a smaller percentage of spoofs is desired, a different threshold T can be selected, for example a threshold at point 1223 resulting in about 15% forfeits. However, the tradeoff is an increased percentage of spoofs at about 11%. Furthermore, it is possible to decide a desired percentage of spoofs or forfeits, and then determine the value of threshold T from the impostor and/or valued cumulative distribution functions. In some embodiments, iterative numerical methods, for example Brent’s method or other root finding methods, can be used to calculate an optimum threshold based on a specified policy (e.g., business policy) for tradeoffs between the spoofs and forfeits. In general, the optimum threshold may be different for different pairs of valued/impostor coins, and even different for different coin counting kiosk locations. An advantage of the inventive technology is that the optimum threshold may be changed according to changing business needs without necessarily having to retrain the coin counting system. The probability distributions obtained from the original training remain valid and can be reused for recalculating a new optimum threshold.

Figure 13:
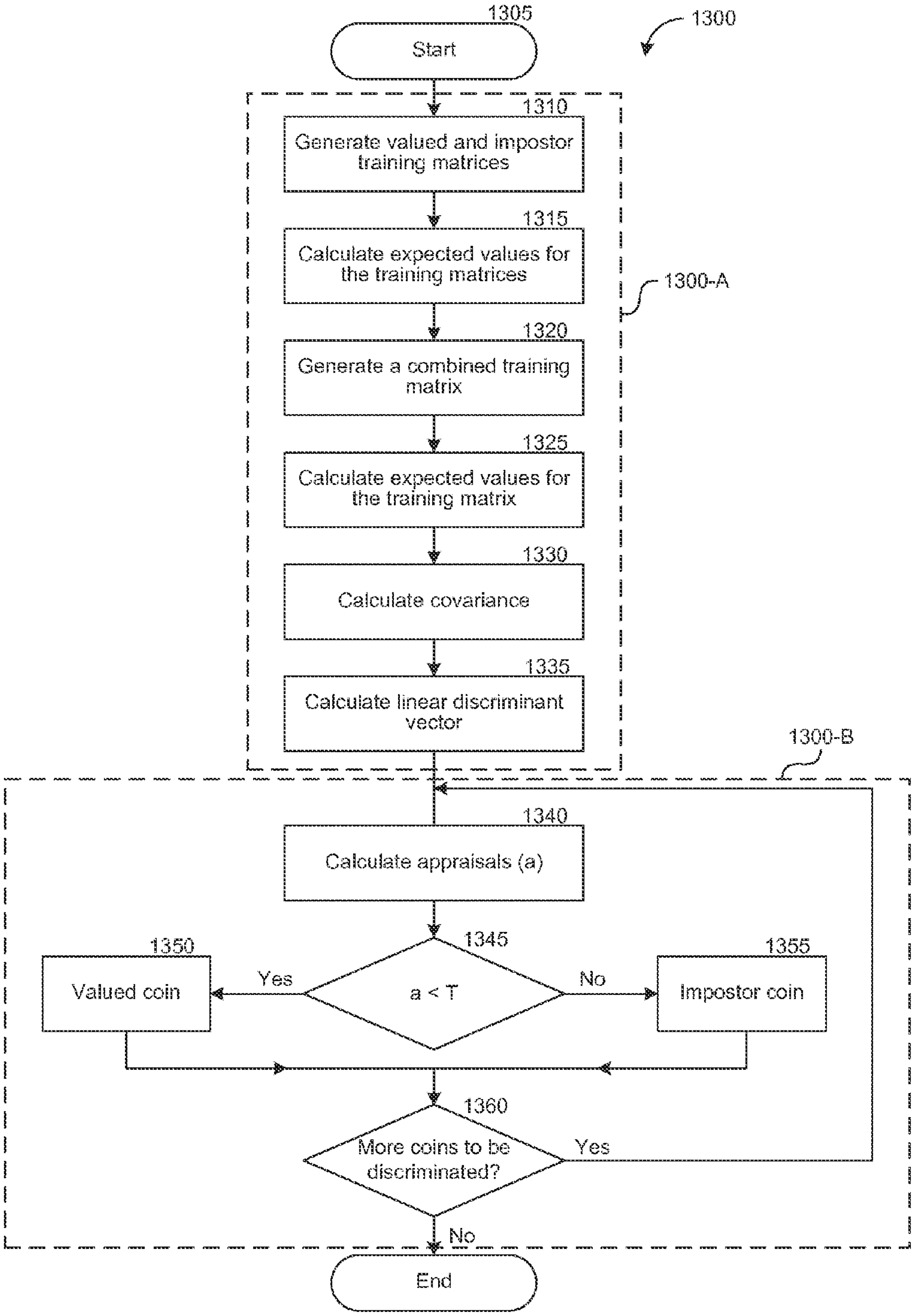
FIG. 13 is a flow diagram illustrating a representative routine for discriminating coins in accordance with an embodiment of the present technology.

FIG. 13 illustrates a process flow or flow diagram 1300 having a routine 1300-A for calibrating coin counting systems and a routine 1300-B for discriminating coins in accordance with the disclosed technology. The process flow 1300 does not show all steps for calibrating the system and discriminating the coins, but instead provides sufficient details to provide a thorough understanding of process steps for practicing various embodiments of the technology. Those of ordinary skill in the art will recognize that some process steps can be repeated, varied, omitted, or supplemented, and other (e.g., less important) aspects not shown may be readily implemented without departing from the spirit or scope of the present disclosure.

The training of a coin counting system, i.e., routine 1300-A, starts in block 1305. In block 1310, the valued and impostor training matrices are generated from valued and impostor fingerprint column vectors, respectively. The number of columns in the valued and impostor training matrices corresponds to the number of valued and impostor coins, respectively. The number of rows in the valued and impostor training matrices corresponds to the number of points in each fingerprint. Typically, a larger fingerprint, i.e., a fingerprint including a bigger number of points and correspondingly larger amount of information about the coins improves the accuracy of the coin discrimination, but the associated computational effort also increases.

In block 1315, the expected values $\mu_v$ or $\mu_w$ (i.e., the means) are calculated for the training matrix. The expected values are calculated for every matrix row. Therefore, the expected values are the means over the corresponding points in the fingerprints for the valued or impostor coins. For a large number of coins, the expected values $\mu_v$ and $\mu_w$ may represent the fingerprints of an average valued and impostor coin, respectively.

In block 1320, a combined training matrix U is generated by combining the columns of the valued and impostor training matrices. The number of columns in the combined training matrix is the sum of the numbers of columns in the valued and impostor training matrices. The number of rows in the combined training matrix still corresponds to the number of sampled signal points in the fingerprints. In block 1325, the expected values $\mu_U$ of the combined training matrix are calculated per row.

In block 1330, a covariance ω can be calculated for the combined training matrix. The elements in the covariance matrix represent correlation between the respective sample data points in the fingerprints. For example, an element $\psi_{i,j}$ is a measure of the correlation of all i-th elements in the fingerprints to all j-th elements.

In block 1335, a linear discriminant vector d can be calculated from the covariance ψ and the expected values the expected values $\mu_v$ and $\mu_w$. The linear discriminant vector can represent a vector connecting the means of the valued and impostor coin populations in a space having a number of dimensions that equals the number of points in the fingerprints. The linear discriminant vector d is generally different for different valued/impostor pairs of coins. The system may be regarded as trained when a linear discriminant vector or a set of the linear discrimination vectors is determined on a given coin counting system or is otherwise obtained from other coin counting systems.

In accordance with embodiments of the present technology, the coin discrimination routine 1300-B can be performed when the linear discrimination vector d is either known a-priori or obtained through the training. In block 1340, an appraisal (a) of a coin is calculated by a dot multiplication of a transposed linear discriminant vector d and a fingerprint corresponding to the coin. The appraisal represents a measure of a closeness (i.e., a similarity) of a given coin to the mean of the valued coin population relative to the impostor coin population.

In block 1345, a decision can be made about the coin being either valued or impostor by comparing the appraisal to the threshold T. If the appraisal is smaller than the threshold T, then the coin is declared valued in block 1350, and the coin is credited and stored accordingly. Otherwise, if the appraisal is larger than the threshold T, then the coin is declared an impostor in block 1355, and is rejected.

In block 1360, the method verifies whether more coins remain to be discriminated. If there are more coins, the appraisal for the next coin can be calculated in block 1340. The coin discrimination ends in block 1365. The process, may be restarted for the additional pairs of the valued/impostor denominations.

Figure 14:
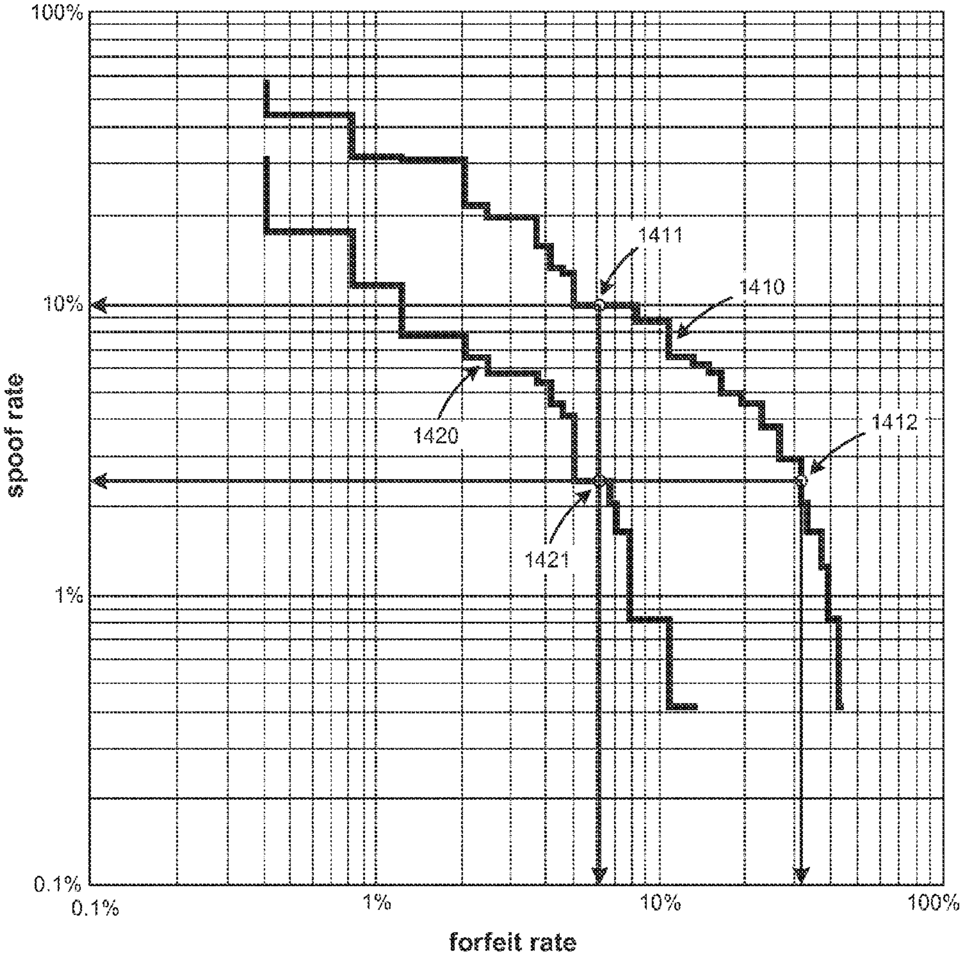
FIG. 14 illustrates sample coin discrimination results in accordance with an embodiment of the present technology.

FIG. 14 illustrates a graph of coin discrimination results obtained by a conventional window method and by an embodiment of the inventive technology. In the illustrated example, the test population had about 1000 valued and about 1000 impostor coins. About 125 valued and 125 impostor coins were used for training. The remaining coins were then evaluated by the conventional and inventive methods. The results are shown in FIG. 14.

The horizontal and vertical axes in FIG. 14 represent the forfeit and spoof percentages, respectively, on the logarithmic scale. A theoretically perfect performance would correspond to the 0-0 point of the graph, i.e., 0% forfeits and 0% spoofs, which is not visible because of the logarithmic scale. Curves 1410, 1420 are the discrimination results obtained by the conventional and inventive methods, respectively. The threshold T was varied to test the inventive method over a range of the thresholds. As the threshold T is increased, fewer valued coins are rejected, but more impostor coins are accepted. For example, for a threshold T corresponding to a point 1421, the inventive method generated about 6% forfeit and about 2.5% spoof coins. However, for this same threshold T, the discrimination results obtained by the conventional method are significantly worse. For example, if the conventional method is adjusted to produce about 6% forfeit rate, the corresponding spoof rate is indicated by a point 1411 at about 10%, which is significantly worse than the 2.5% spoof rate for the inventive method at the same forfeit rate. Conversely, if the conventional method is adjusted to produce about 2.5% spoof rate, the corresponding forfeit rate is indicated by a point 1412 at about 12%, which is significantly worse than the 6% forfeit rate for the inventive method at the same spoof rate. Furthermore, adjusting the conventional method between the points 1411 and 1412 results in a worse performance for any point in between. Therefore, the test results illustrated in FIG. 14 show that the inventive method performs better than the conventional method for any choice of the threshold T.

From the foregoing, it will be appreciated that specific embodiments of the invention have been described herein for purposes of illustration, but that various modifications may be made without deviating from the spirit and scope of the various embodiments of the invention. For example, other signals in addition or instead of the four coin sensor signals (LD, HD, LQ, HQ) can be used. In some embodiments, the signals can be sampled at different frequencies and then numerically summed together using appropriate time offsets to create a combined signal. In some markets, there may be more than one impostor denomination threatening a given valued denomination. During the processing of a valued coin, the appraisals can be calculated for multiple suspect impostor coins and compared to the corresponding thresholds. In some embodiments, only if all appraisals succeed, the coin is declared valued and is accepted. Furthermore, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

I claim:

1. A computer-implemented method for discriminating coins, the method comprising:

acquiring a sensor signal of a coin;

generating a fingerprint having a plurality of sampled sensor points from the sensor signal;

calculating an appraisal from the fingerprint and a linear discriminant vector, wherein the linear discriminant vector is an inverse of a covariance matrix, and wherein the covariance matrix includes a valued training matrix from a valued coin population and an impostor training matrix from an impostor coin population; and comparing the appraisal to a threshold to discriminate the coin.

2. The method of claim 1 wherein generating the fingerprint includes generating a set of sampled signal points from one or more sensor signals.

3. The method of claim 1 wherein generating a fingerprint further comprises:

selecting at least one feature from the sensor signal, determining a sampled sensor signal that corresponds to the at least one feature, and assigning the sampled sensor signal to the fingerprint.

4. The method of claim 3 wherein the sampled sensor signal is a first sampled sensor signal, and wherein the method further comprises:

selecting at least one marker from the sensor signal, determining a second sampled sensor signal that corresponds to the at least one marker, and assigning the second sampled sensor signal to the fingerprint.

5. The method of claim 2 wherein calculating the appraisal includes a scalar multiplication of the transpose of the linear discriminant vector and the appraisal.

6. The method of claim 1 wherein the threshold is an optimized threshold, and wherein the method further comprises determining the threshold using one or more iterative numerical methods.

7. The method of claim 1, further comprising:

determining a desired rate of spoofs; and calculating the threshold from a density probability function of an impostor coin population and the desired rate of spoofs.

8. The method of claim 1, further comprising:

determining a desired rate of forfeits; and calculating the threshold from a density probability function of a valued coin population and the desired rate of forfeits.

9. The method of claim 1, further comprising filtering the sensor signal using a digital filter.

10. A consumer operated coin counting apparatus comprising:

a coin input region configured to receive a plurality of coins;

a coin sensor configured to generate one or more sensor signals corresponding to coin properties;

means for generating fingerprints having a plurality of sampled points from the sensor signals;

means for determining appraisals from the fingerprints and a linear discrimination discriminant vector, wherein the linear discriminant vector is an inverse of a covariance matrix, and wherein the covariance matrix includes a valued training matrix from a valued coin population and an impostor training matrix from an impostor coin population; and means for discriminating the coins by comparing the appraisals to a threshold.

11. The apparatus of claim 10 wherein the plurality of coins comprises a plurality of valued coins and a plurality of impostor coins, and wherein the apparatus further comprises means for determining the linear discriminant vector from the fingerprints belonging to the plurality of the valued coins and the plurality of the impostor coins.

12. The apparatus of claim 10 wherein a consumer operated coin counting apparatus is a first consumer operated coin counting apparatus, wherein the linear discriminant vector is obtained by a second consumer operated coin counting apparatus.

13. The apparatus of claim 11, further comprising:

means for generating sampled sensor signals from the sensor signals;

means for determining at least one feature of the sensor signal, means for determining at least one sampled sensor signal that corresponds to the at least one feature, and assigning the at least one sampled sensor signal to the fingerprint.

14. The apparatus of claim 13 wherein the at least one feature of the sensor signal is an approach point.

15. The apparatus of claim 13 wherein the at least one feature of the sensor signal is a departure point.

16. The apparatus of claim 13 wherein the at least one sampled sensor signal is a first sampled sensor signal, further comprising:

means for determining at least one marker of the sensor signal, means for determining a second sampled sensor signal that corresponds to the at least one marker, and means for assigning at least one sampled sensor signal to the fingerprint.

17. The apparatus of claim 16, further comprising means for determining a plurality of non-uniformly spaced markers.

18. The apparatus of claim 13 wherein the means for determining at least one feature of the sensor signal comprise means for determining a minimum voltage of the sensor signal.

19. The apparatus of claim 10 wherein the fingerprint comprises sampled points from low frequency inductance (LD), low frequency resistance/conductance (LQ), high frequency inductance (HD) and high frequency resistance/conductance (HQ) sensor signals.

20. A computer-readable medium whose contents cause a computer to discriminate coins, the coins being discriminated by a method comprising:

receiving multiple coins;

obtaining a sensor signal of one of the coins;

detecting a coin feature in the sensor signal;

generating a fingerprint at least in part from the coin feature;

calculating an appraisal from the fingerprint and a linear discriminant vector, wherein the linear discriminant vector is an inverse of a covariance matrix, and wherein the covariance matrix includes a valued training matrix from a valued coin population and an impostor training matrix from an impostor coin population; and comparing the appraisal to a threshold.

21. The computer readable medium of claim 20 wherein the method further comprises accepting or rejecting the coin based on results of comparing the appraisal to the threshold of known coin denomination.

22. The computer readable medium of claim 20 wherein calculating an appraisal includes determining a dot product of a transpose of the linear discriminant vector and the fingerprint.

23. The computer readable medium of claim 22 wherein the linear discriminant vector is obtained from the sensor signals of a valued coin population and an impostor coin population.

24. The computer readable medium of claim 20 wherein the method further comprises:

replacing the coin feature with at least one sampled sensor signal; and assigning the at least one sampled sensor signal to the fingerprint.

25. The computer readable medium of claim 20 wherein the method further comprises determining the threshold based at least in part on a desired ratio of spoofs.

26. The computer readable medium of claim 20, wherein the method further comprises determining the threshold based at least in part on a desired ratio of forfeits.

27. A computer-implemented method for discriminating coins, the method comprising:

acquiring a sensor signal of a coin;

calculating an appraisal from the sensor signal and a linear discriminant vector, wherein the linear discriminant vector is an inverse of a covariance matrix, and wherein the covariance matrix includes a valued training matrix from a valued coin population and an impostor training matrix from an impostor coin population; and comparing the appraisal to a threshold to discriminate the coin.

* * * * *